US005691040A

United States Patent [19]
Barbeau et al.

[11] Patent Number: 5,691,040
[45] Date of Patent: *Nov. 25, 1997

[54] LINER FOR FIREFIGHTER GARMENT MADE OF A LAMINATE OF A WOVEN FABRIC AND A NON-WOVEN MATERIAL

[75] Inventors: Claude Barbeau, Saint-Lambert; Ross Cochran, Ville Mont-Royal, both of Canada

[73] Assignee: Marcanada Inc., Montreal, Canada

[*] Notice: The term of this patent shall not extend beyond the expiration date of Pat. No. 5,624,738.

[21] Appl. No.: 573,993

[22] Filed: Dec. 18, 1995

[51] Int. Cl.$^6$ .................................................. B32B 27/14
[52] U.S. Cl. ........................ 428/198; 2/81; 2/456; 428/902; 428/920; 428/921; 442/268; 442/304
[58] Field of Search ........................... 428/198, 246, 428/252, 253, 255, 902, 920, 921, 247, 473.5, 474.7; 2/456, 81; 442/268, 304

[56] References Cited

U.S. PATENT DOCUMENTS

| | | | |
|---|---|---|---|
| 4,034,417 | 7/1977 | Ellis | 2/81 |
| 4,188,445 | 2/1980 | Hill | 428/246 |
| 4,255,817 | 3/1981 | Heim | 2/2 |
| 4,502,153 | 3/1985 | Lapedes | 2/81 |
| 4,569,088 | 2/1986 | Frankenburg et al. | 2/81 |
| 4,849,280 | 7/1989 | Coombs | 428/233 |
| 4,869,947 | 9/1989 | Hirayoglu | 428/920 |
| 4,937,136 | 6/1990 | Coombs | 428/233 |
| 4,999,236 | 3/1991 | McCullough et al. | 428/233 |
| 5,001,783 | 3/1991 | Grilliot et al. | 428/920 |
| 5,007,112 | 4/1991 | Lewis, Jr. et al. | 2/79 |
| 5,014,357 | 5/1991 | Wiseman | 2/81 |
| 5,050,241 | 9/1991 | Flowers et al. | 2/81 |
| 5,098,770 | 3/1992 | Paire | 428/920 |
| 5,131,097 | 7/1992 | Grilliot et al. | 428/920 |
| 5,136,723 | 8/1992 | Aldridge et al. | 2/81 |
| 5,447,787 | 9/1995 | Shaffer | 428/902 |
| 5,468,537 | 11/1995 | Brown et al. | 428/902 |

*Primary Examiner*—James J. Bell

[57] ABSTRACT

The laminate is formed of a sheet of a woven textile material derived from multifilamentary aramid, polyimide, polyamide, polybenzimidazole or cellulose fire retardant yarns and a sheet of non-woven textile material. The adhesive used to produce the laminate should prevent slippage of the two materials relative to one another and fraying of the woven textile material while enabling the laminate to be air permeable, and having a minimum ten (10) cubic feet per minute (CFM) when tested in accordance with test method ASTM D737. This product is cheaper to manufacture and is more comfortable than the known quilted and coated material.

6 Claims, No Drawings

LINER FOR FIREFIGHTER GARMENT MADE OF A LAMINATE OF A WOVEN FABRIC AND A NON-WOVEN MATERIAL

BACKGROUND OF THE INVENTION (a) Field of the Invention

This invention relates to a liner for a fire-resistant garment, such as a firefighter protective garment. More particularly, the present invention is concerned with a thermal protective liner system composed of a textile material which is a woven or knitted mulifilament fabric, laminated to an insulating medium and which provides a minimum of air permeability of ten (10) cubic feet per minute (CFM), when tested in accordance with ASTM D737.

(b) Description of Prior Art

Firefighter protective garments usually consist of three or more discrete layers of fire-resistant materials. The various layers are normally:

1) the outer shell which provides protection against puncture, cuts, flame and heat;
2) the moisture barrier substrate and moisture barrier polymer which, although fire-resistant, have as their principal purpose protection against liquid penetration (in certain cases they are permeable to perspiration vapor to increase wearer comfort);
3) the thermal barrier insulation whose principal function is to provide protection against heat transfer; and
4) the inner lining or face cloth (which is normally quilted to the thermal barrier insulation) which protects the thermal barrier from wear from the inside of the garment, and provides a last layer of heat and flame protection.

It will be seen that the inner liner of a firefighter protective garment therefore consists of an inner lining and a thermal barrier material.

To provide a liner which includes a fire-resistant multifilament fabric, the latter is normally quilted to thermal barrier insulation. In order to prevent slipping and fraying of the multifilament inner lining, it is customary to apply an anti-slippage coating which is well known to those skilled in the art, such as micro coating or kiss coating, to the inner lining. However, in doing so, the liner becomes less permeable to air which is of course undesirable. Indeed, the material should be permeable to air to provide comfort to the user and to enable the evaporation of perspiration.

In an effort to provide a liner wherein the inner lining increases wearer comfort, reduces metabolic energy requirements and decreases metabolic heat build-up, applicant has designed an improved inner lining which reduces restriction to movement by the wearer and permits easier and quicker donning and doffing of the garment. A lining of this type is described in U.S. Ser. No. 214,571 filed Mar. 18, 1994 and in U.S. Pat. No. 5,323,815 issued Jun. 28, 1994. This inner lining is based on aramid, polyimide, polyamide or polybenzimidazole yarns, or yarns made of cellulose fire retardant material. Commercially, this inner lining is available under the commercial designation of Ultraflex TM.

It will therefore be seen that providing an inner lining with an anti-slippage coating and quilting it to the material of the thermal barrier is undesirable.

On the other hand, it is known to produce a laminated inner liner for various articles such as disclosed in the following U.S. Pat. Nos.:
5,007,112
4,999,236
4,937,136
4,188,445

However, none of the laminates disclosed in the above patents are concerned with providing a fire-resistant multifilament inner liner permeable to air, and none of them teach a way to do so.

SUMMARY OF INVENTION

It is therefore an object of the present invention to provide an inner liner for firefighter garments, which is free of slippage and fraying between the layers of the garment and which is permeable to air.

The above and other objects of the present invention may be achieved in a liner for firefighter garments, which comprises a laminate formed of a sheet of textile material derived from multifilamentary aramid, polyimide, polyamide, polybenzimidazole or cellulose fire retardant yarns and a non-woven textile material in sheet form, and adhesive means enabling the sheet of textile material and the sheet of non-woven material to be laminated in such a manner that the sheet of textile material and the sheet of non-woven textile material, are non-slipping and non-fraying relative to one another while enabling the laminate to be air permeable with a minimum of ten (10) cubic feet per minute (CFM) air permeability when tested in accordance with ASTM D737.

DESCRIPTION OF PREFERRED EMBODIMENTS

In accordance with a preferred embodiment, the textile material consists of a weave of warp and weft yarns which are multifilamentary aramid, polyimide, polybenzimidazole or cellulose fire-retardant yarns. Preferably the textile material has a weight which is less than 4.0 ounces per square yard and is made of yarn size of 80 to 250 deniers.

In accordance with another embodiment, the textile material is a knitting of multifilamentary aramid, polyimide, polyamide or polybenzimidazole yarns or yarns made of cellulose fire retardant material.

The preferred textile material is a plain weave of aramid yarns, while the preferred non-woven material is made of needle punch aramid, polyimide, polybenzimidazole, carbon or cullulose fire retardant fibers.

The laminate according to the invention is prepared by any well known lamination process except that the adhesive is deposited such as by spraying so as to produce a large number of bonds, dots or spider web, rather than a continuous film, thereby enabling the laminate to be air permeable. An example of the adhesive that may be used is a moisture curing PUR prepolymer hot melt adhesive.

We claim:

1. In a firefighter garment including a fire-resistant outer shell, moisture barrier and thermal liner, the improvement wherein said thermal liner comprises a laminate formed of a sheet of woven textile material derived from multifilamentary aramid, polyimide, polyamide, polybenzimidazole or cellulose fire-resistant yarns; a second sheet of non-woven fire-resistant textile material acting as a thermal insulating barrier, and adhesive means enabling said sheet of textile material and sheet of non-woven textile material to be laminated in such a manner that said sheet of textile material and said sheet of non-woven textile material are non-slipping relative to one another while enabling said laminate to be air permeable, with a minimum of ten (10) cubic feet per minute (CFM) air permeability when tested in accordance with ASTM D737 and that the laminate also inhibits fraying of the woven textile material.

2. A firefighter garment according to claim 1, wherein said textile material has a weight which is less than 4.0 ounces per square yard.

3. A firefighter garment according to claim 2, wherein said textile material is made of yarn size of 80 to 250 deniers.

4. A firefighter garment according to claim 1, wherein said textile material consists of a knitting of multifilamentary aramid, polyimide, polyamide or polybenzimidazole yarns, or yarns made of cellulose fire retardant material.

5. A firefighter garment according to claim 1, wherein said sheet of textile material consists of a plain weave of aramid yarns, and said sheet of non-woven textile material consists of a needle punch aramid, polyimide, polybenzimidazole, carbon or cellulose fire retardant fibers.

6. A firefighter garment according to claim 1, wherein said sheet of textile material and said sheet of non-woven textile material are laminated with a plurality of dot or spider web bonds, therebetween allowing said laminate to be air permeable, said liner having a minimum air permeability of ten (10) cubic feet per minute (CFM) when tested in accordance with test method ASTM D737.

* * * * *